United States Patent
Tabrizi et al.

(10) Patent No.: US 6,605,940 B1
(45) Date of Patent: Aug. 12, 2003

(54) LINEAR VARIABLE DIFFERENTIAL TRANSFORMER ASSEMBLY WITH NULLING ADJUSTMENT AND PROCESS FOR NULLING ADJUSTMENT

(75) Inventors: Sohail Tabrizi, Castaic, CA (US); Hedayatollah Shakibai, Westlake Village, CA (US); Leonard J. Marella, Canoga Park, CA (US)

(73) Assignee: Kavlico Corporation, Moorpark, CA (US)

(*) Notice: Subject to any disclaimer, the term of this patent is extended or adjusted under 35 U.S.C. 154(b) by 0 days.

(21) Appl. No.: 09/547,511

(22) Filed: Apr. 12, 2000

(51) Int. Cl.$^7$ .......................... G01B 7/14; G01R 35/00; H01F 21/06; H01F 29/12; H02P 13/10
(52) U.S. Cl. .................. 324/207.18; 324/202; 73/1.79; 336/136; 340/870.36
(58) Field of Search ............... 324/202, 207.15–207.19, 324/207.24; 33/789; 336/30, 45, 130, 136; 73/1.59–1.62, 1.79, 1.81, 722, 728, 735; 340/870.35, 870.36; 318/656, 657

(56) References Cited

U.S. PATENT DOCUMENTS

| | | | |
|---|---|---|---|
| 2,364,237 A | 12/1944 | Neff | 33/147 |
| 2,564,221 A | * 8/1951 | Hornfeck | 336/136 X |
| 2,627,119 A | 2/1953 | Graham | 33/172 |
| 3,108,213 A | * 10/1963 | Golder et al. | 336/136 X |
| 3,662,603 A | * 5/1972 | Breunich et al. | 73/722 |
| 4,510,474 A | * 4/1985 | Romes et al. | 336/136 X |
| 4,524,624 A | * 6/1985 | Di Noia et al. | 73/722 X |
| 4,535,624 A | 8/1985 | Ginns et al. | 73/119 R |
| 4,543,732 A | 10/1985 | Maples | 33/502 |
| 4,675,603 A | 6/1987 | Rajakovics | 324/208 |
| 5,087,879 A | 2/1992 | Sugifune et al. | 324/207.25 |
| 5,451,868 A | 9/1995 | Lock | 324/173 |
| 5,804,962 A | 9/1998 | Kather et al. | 324/207.16 |

* cited by examiner

Primary Examiner—Gerard R. Strecker

(57) ABSTRACT

A linear variable differential transformer (LVDT) assembly comprises a housing. A tube extends into the housing. An armature mounts inside of the tube and can move longitudinally within the tube. A coil assembly, which includes a primary coil and two secondary coils mounts on the outside of the tube. The coil assembly has adjustable connection with the housing. Consequently, the coil assembly can be adjusted longitudinally with respect to the armature until the LVDT is in the null position. That occurs when the differential voltage from alternating current through the secondary coils is zero.

21 Claims, 2 Drawing Sheets

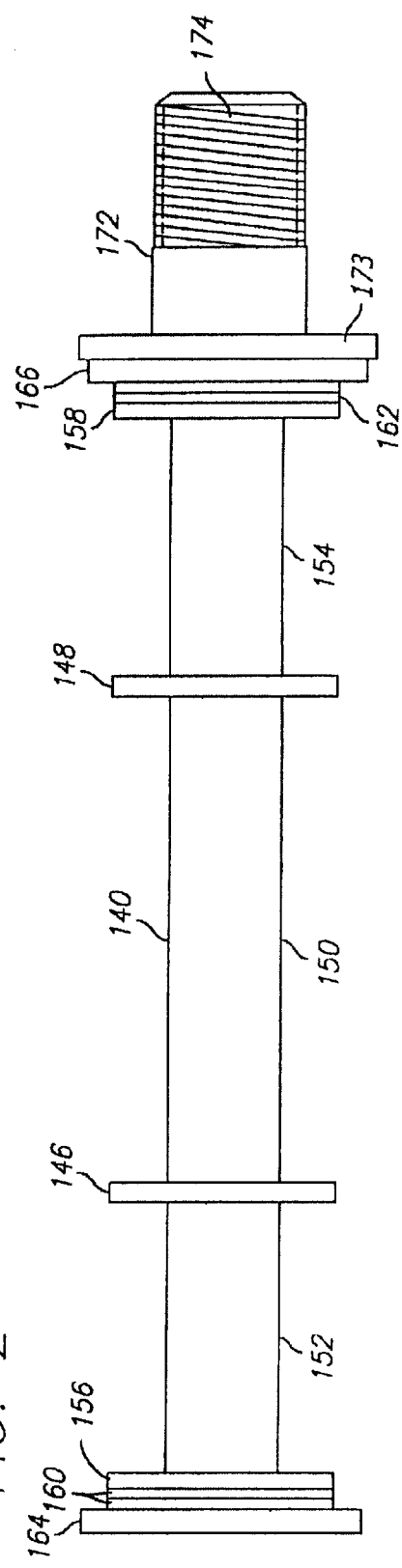
FIG. 2
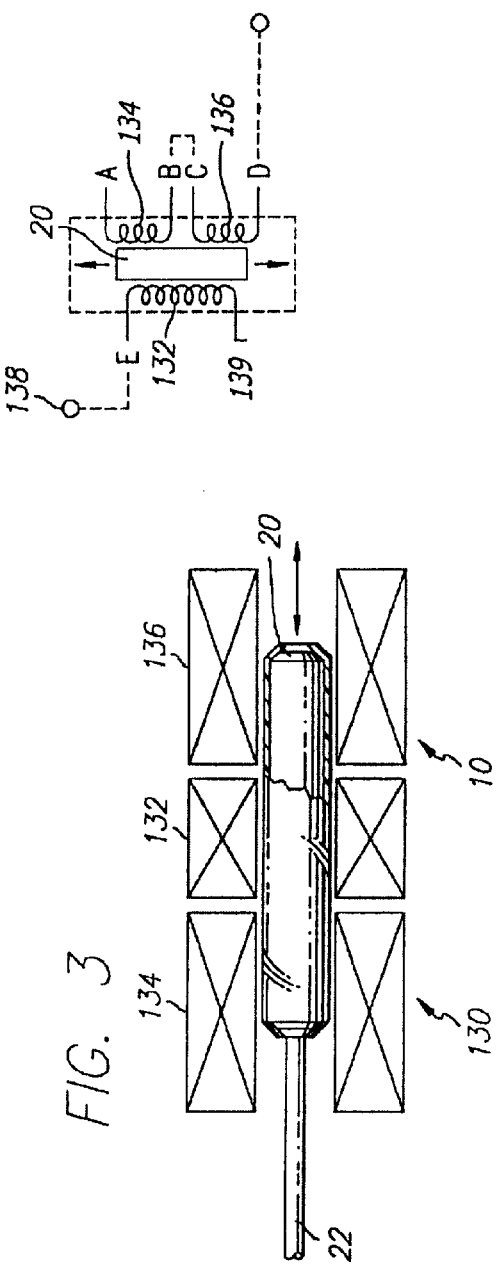
FIG. 3
FIG. 4

LINEAR VARIABLE DIFFERENTIAL TRANSFORMER ASSEMBLY WITH NULLING ADJUSTMENT AND PROCESS FOR NULLING ADJUSTMENT

BACKGROUND OF THE INVENTION

1. Field of the Invention

The present invention relates to a device for adjusting the null value of a linear variable differential transformer (LVDT)

2. General Background and State of the Art

A linear variable differential transformer (LVDT) is a displacement transducer that produces an electrical signal proportional to the displacement of a moveable core (armature) within a cylindrical transformer. The transformer consists of a central, primary coil winding and two secondary coil windings on opposite ends of the primary winding. The coil windings are coaxial. The armature preferably is nickel-iron and is positioned within the coil assembly. The core provides a path for magnetic flux linking the primary coil to the secondary coils.

When the primary coil is energized with an alternating current, a cylindrical flux field is produced over the length of the armature. This flux field produces a voltage in each of the two secondary coils that varies as a function of the armature position. Armature movement moves the flux field into one secondary and out of the other causing an increase in the voltage induced in one secondary and a corresponding voltage decrease in the other. The secondary coils are normally connected in series with opposing phase. The net output of the LVDT is the difference between the two secondary voltages. When the armature is positioned symmetrically relative to the two secondaries (the "null" position), the differential output is approximately zero, because the voltage of each secondary is equal but of opposite phase.

Subjecting a transducer to pressure can move an LVDT armature through a linkage. As pressure increases, the armature moves toward one secondary winding and away from the other. This yields a voltage difference that can be proportional to the pressure on the transducer. Consequently, this voltage output can measure pressure and position.

Nearly all LVDTs that are designed for aircraft or missile applications are wound on an insulated stainless steel spool, magnetically shielded and enclosed in a stainless steel housing using welded construction. The armature is normally made from a 50% nickel-iron alloy and brazed to a stainless steel extension. Secondary leads are usually shielded to minimize channel-to-channel crosstalk for multichannel units and to shield components from RF energy.

The length and diameter of an LVDT must be sufficient to allow adequate winding space for achieving the desired electrical performance, support any pressure requirement and withstand the environmental shock, vibration and acceleration. Where physical size is limited, electrical performance must be flexible. Although the LVDT is basically a simple device, the operating characteristics and electrical parameters are complex and depend to a large extent on the physical limitations.

The minimum diameter of the transformer housing will depend on electrical performance criteria for the excitation frequency being used and housing wall thickness required to support a pressure requirement. Armature diameters less than 0.110 in. (2.8 mm) (metric conversions are approximate) are easily damaged and are not recommended. The armature and the probe to which the armature is attached mounts within a tubular member. The probe and tube through which the armature moves should be slightly larger in diameter than the armature to protect the armature from rubbing against the tube.

The full scale or span is the displacement range of the LVDTs armature for which the electrical performance is required and is referred to as the electrical stroke. Since an LVDT is normally, although not necessarily, a center null device (zero output occurs at mid-stroke), the range or stroke is normally specified as a plus and minus displacement from the null position. The full stroke (100% of the stroke) is the total end-to-end stroke, and the full scale output (100% of the output) is the total end-to-end output voltage.

An LVDT requires an AC voltage for operation. This excitation could be provided by aircraft buss power or an excitation source specifically designed for an LVDT. In today's aerospace and aircraft industry, multi-channels with individual excitation sources are often used to obtain the highest possible system reliability.

An LVDT's output voltage is pro portional to the voltage applied to the primary. System accuracy depends on providing a constant input to the primary or compensating for variations of the input by using ratio techniques. The output can be taken as the differential voltage or, with a center tap, as two separate secondary voltages whose difference is a function of the displacement. If the sum of the secondary voltages is designed to be a specific ratio of the difference voltage, overall accuracy significantly improves.

Resolution of an LVDT is the smallest change in armature position which can be detected as a change in the output voltage. Sub-micro-inch resolution is not uncommon with LVDTs. In practice, the resolution is usually less than the noise threshold of external circuitry or resolution of the equipment used to measure the output.

Where system reliability requires more than one output signal for redundancy, up to four independent LVDTs can be packaged in a single transducer assembly. Coil placement may be in series or grouped side-by -side as a cluster. Multiple LVDT's in one housing require less space, weight, installation time and cost less than separately mounted LVDTs. Dual LVDT assemblies are two coils combined, in tandem or parallel. The choice of the configuration could be limited by the length or diameter of the envelope available for the installation. Triple LVDT assemblies are usually combined in parallel. The tandem configuration is excessively long for strokes above one inch. Finally, quad LVDT assemblies are nearly always combined in parallel.

Having an accurate starting point for the LVDT is necessary for accurate measurement. That starting point has the armature centered and the differential output is zero. When that occurs, the armature is in its null position.

The prior art recognizes the advantages of being able to adjust that null position. Examples include. Kather, U.S. Pat. No. 5,804,962 (1998), and Maples, U.S. Pat. No. 4,543,732 (1985).

INVENTION SUMMARY

In some cases it is desired to use an LVDT to determine the position of a linkage in a pressurized zone, and to be able to adjust the null position of the LVDT. Adjusting the null position may be accomplished by having the magnetic element of the LVDT move within a sealed tube, with the tube extending outward from the pressurized zone. Adjusting the null point of the LVDT without removing the sealed tube is desirable. It also is important not to place torsional stress on the tube that holds the pressure while the null is being adjusted.

One object, therefore, of the present invention is to provide an LVDT with simplified null adjustments. One problem with adjusting the null position relates to the assembler. It is an object of the present invention to enable an assembler to assemble a sensor, pressurize the system and then adjust the null position. One problem with some LVDT is that adjustments to the null position apply torque to one or more of the parts. That torque can lead to inaccurate measurements and could rupture the seal of the sealed tube in which the magnetic element moves. Therefore, it is an object of the present invention to provide a null adjustment mechanism that does not apply torque to the sealed tube. Another object of the present invention is to disclose and provide a method for adjusting the null position of an LVDT such that the coil assembly is moved relative to the LVDT assembly.

Many systems for adjusting the null position do so by positioning the armature. It is an object of the present invention to avoid moving the armature during the adjustment procedure.

In the present invention, the LVDT coils themselves are mounted for movement relative to an armature that remains fixed during the null adjusting step. The tube in which the armature mounts and the armature itself are fixed, and the support for the coils can be adjusted axially relative to the armature and its supporting tube. This adjustment is preferably through a threaded connection at the outer end of the coil assembly. Springs bias the coil support to maintain tightness in the system and to avoid backlash.

In one illustrative embodiment of the invention, the linear variable differential transformer (LVDT) assembly with nulling adjustment comprises a housing defining a pressure barrier between first and second zones. An armature tube is sealed to the housing at its inner end. The tube has an outer end that extends into the second zone and a central section. An LVDT multiple coil assembly extends around the central section of the tube and is movable longitudinally relative to the tube. A magnetic armature mounts on a mechanical linkage and extends into the tube within the multiple coil assembly. A fixed support in the housing extends around the tube near the tube's outer end. The coil assembly is adjustable axially along the tube and armature. A spring biases the coil assembly away from the fixed support toward the inner end of the tube. In one embodiment, the adjusting mechanism includes a threaded member secured to the coil assembly and extending along the outer end of the tube through the fixed support. An adjusting nut on the other side of the fixed support from the housing engages the threaded member and bears on the fixed support as a result of the biasing force of the spring.

BRIEF DESCRIPTION OF THE DRAWINGS

FIG. 2 is a plan view of the linear variable differential transformer assembly of the present invention.

FIG. 3 is a partial schematic of the armature and coils of the linear variable differential transformer assembly of the present invention.

FIG. 4 is a circuit diagram for linear variable differential transformer assembly of the present invention.

FIG. 5 is an end view showing a housing using three linear variable differential transformer assemblies of the present invention.

DETAILED DESCRIPTION OF THE PREFERRED EMBODIMENTS

Figure 1:
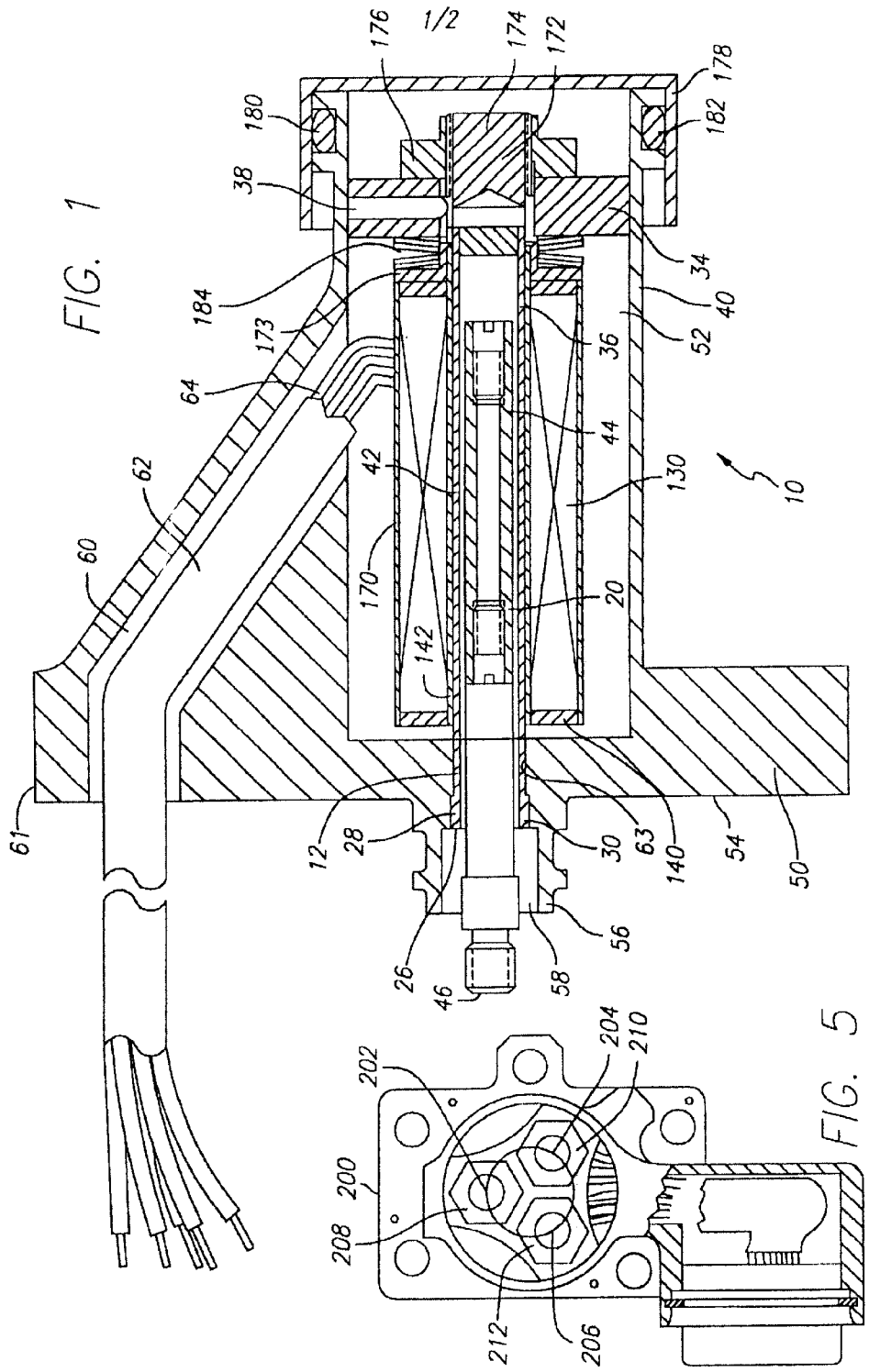
FIG. 1 is a side, sectional view of one embodiment of the linear variable differential transformer assembly with nulling adjustment of the present invention.

LVDT 10 comprises an armature 20 that moves longitudinally in the direction of the arrows in FIG. 3. The armature is iron or a nickel/iron alloy which affects magnetic flux or it is naturally magnetic. The armature connects to a shaft 22, which acts as a linkage to a pressure producing source. Increases or decreases in measured pressure act through linkage 22 on armature 20 to move the armature longitudinally. Two electrical coils, a center, primary coil 132, and first and second secondary coils 134 and 136 form a coil assembly 130. The coil assembly surrounds the armature 20 (FIG. 3).

The armature's stroke length varies with its environment. In the exemplary embodiment, the stroke length can range from 0.1 inc. (2.5 mm) to as much as 14 in. (356 mm). At the smaller stroke length, an armature of 0.67 in. (17 mm) yields acceptable results. For the longer stroke length, a 4 in. (102 mm) armature provides acceptable readings.

Alternating current is applied between terminals 138 and 139 (FIG. 4). Applicant recommends an alternating current at 1,800 to 3,500 Hz for good performance based on typical armature lengths. The flow of alternating current through primary winding 132 generates magnetic flux, which is coupled to secondary windings 134 and 136 through armature 20 (FIG. 4). The magnetic flux produces a voltage in each secondary winding. The two secondary windings normally have opposing phases. When the armature moves longitudinally (vertically in FIG. 4), it increases the voltage in one of the secondary windings and causes a corresponding voltage decrease in the other secondary winding. The voltage between points A and B over secondary winding 134 is compared to the between points C and D over secondary winding 136. The difference between the two secondary voltages is the net output of the LVDT.

When the armature 20 is in a position evenly spaced between the two secondary windings 134 and 136, the differential output is approximately zero. That is the null position of the LVDT.

Turning to the structure of the exemplary embodiment, the LVDT assembly 10 of the present invention mounts within a housing 50 (FIG. 1). The housing defines a pressure barrier between ambient pressure in a first zone outside the housing and internal pressure within the housing in a second zone 52. The housing is preferably stainless steel or other corrosion-resistant material. The housing's shape is determined, in part, by its environment.

The housing has a front wall 54. A fitting 56 extends outward from the front wall (to the left in FIG. 1). A bore 58 extends through the fitting 56 and continues as bore 63 through the front wall 54 into the second zone 52. The housing also has a channel 60 through an extension 61 of the housing. The channel is angled over part of its length to exit perpendicular to the front wall 54 of the housing. The channel houses a conduit 62, which contains electrical leads 64 to the LVDT (FIG. 1). After assembly, the channel is partially filled with a potting compound for sealing the channel.

A tube 12 for the LVDT is sealed to the housing. The tube is cylindrical in the exemplary embodiment. As discussed below, core or armature 20 also is cylindrical and is within tube 12. The cylindrical shape minimizes friction between the tube and armature and prevents the armature from applying torque to the tube. Thus, while applicant contemplates possibly using tubes and armatures without a circular cross-section, those shapes are not as desirable. The tube preferably is stainless steel.

The tube has a central section and inner and outer ends. In the exemplary embodiment, the inner end 26 of the tube extends through bore 63 in the housing The tube is sealed at the bore to maintain a pressure barrier between the first and second zones. The tube has an annular ridge 28, which rests in a corresponding cut-out portion 30 in the housing (FIG. 1).

A support 34 mounts within the housing and extends around the outer end 36 of the tube 12 (FIG. 1). One or more pins 38 may extend radially through the support. The support is welded or otherwise attached to the rear end 40 of the housing. The central section 42 of the tube 12 extends into the second zone 52.

The LVDT multiple coil assembly 130 (FIG. 1) extends around the central section 42 of the tube 12. The coils mount on spool assembly 140 (FIGS. 1 and 2). The spool assembly is tubular and has an inner wall 142 that surrounds the central section 42 of tube 12. The inside diameter of inner wall 142 is slightly greater than the outside diameter of the central section 42 of the tube 12. These dimensions permit the spool assembly 140 to move longitudinally along the tube. The spool assembly 140 has two dividers 146 and 148 (FIG. 2). The dividers separate the primary coil 132 from the two secondary coils 134 and 136. The primary coil surrounds region 150, and the secondary coils surround regions 152 and 154 (FIG. 2).

Dividers 146 and 148 are of Teflon or other plastic material. Likewise, Teflon washers 156 and 158 are at the outer ends of the regions 152 and 154 for the secondary windings. Floating washers 160 and 162 separate the end Teflon washers 156 and 158 from end cap 164 and floating washer 166 (FIG. 2). A thin cover 170 (shown only in FIG. 1) may extend over the coils between cap 164 and floating washer 166 adjacent to end cap 173. The Teflon washers 156, 146, 148 and 158 support cover 170. As FIG. 1 shows, end cap 173 is spaced from support 34. A pair of spring washers 184 mount in the space between end cap 173 and support 34. These spring washers urge the coil assembly to the left in FIG. 1.

A portion 172 of the coil assembly extends to the right of support 34 and, consequently, also extends beyond the right termination of tube 42. Portion 172 has a threaded end 174. An adjusting nut 176, which rests against support 34, is threaded to threaded end 174 (FIG. 1). The pin 38 engages a slot 39 along the length of the threaded end 174. This engagement guides the spool assembly 140 longitudinally.

Those of ordinary skill will appreciate current techniques for winding transformer windings. Wire with thin but effective insulation is wound tightly into coils around the outside of spool assembly 140. Neither the wires nor the coils are shown in FIG. 2, however. Although wire with a cylindrical cross-section is commonly used in transformers, in some instances one would want to use wire with a square or rectangular cross-section to maximize the number of coils within a given volume.

An end cap 178 covers the right side of the housing. An O-ring 180 within channel 182 provides a seal for the end cap 178. The end cap is removable to allow access to threaded nut 176. Applicants anticipate that the right side (FIG. 1) of the housing likely will be cylindrical. The end cap 178, therefore, also will be cylindrical. Depending on the environment, a non-cylindrical cross-section may be used.

Armature 20 contains a magnet 44 or other material, such as iron or iron/nickel alloy capable of affecting the flux in coils 132, 134 and 136. The armature also has a linkage 46 extending outside the housing. The linkage moves in response to force from a transducer, usually a pressure transducer. As linkage 46 moves, the magnet 44 within armature 20 moves the same distance. That movement creates a measurable voltage difference between the two secondary coils 134 and 136 (FIG. 3).

As previously stated, the armature must be in the null position at rest. After the device is assembled, the assembler electrically activates the device and reads any voltage difference between the two secondary coils. If any exist, the assembler adjusts the position of the coil assembly by tightening or loosening nut 176 on threaded end 174 of the coil assembly. Normally, this is done before end cap 178 is assembled onto the housing. If the end cap is already on the housing, it can be removed.

Using threaded nut 176 to adjust the spool assembly is one way of effecting that movement. Such an arrangement is usually a good way to cause precise longitudinal movements. Other devices could be used in place of the threaded nut. For example, one could use a slider with an inclined surface acting on the spool assembly. Pulleys and gear assemblies are feasible but add complexity to the adjustment.

Spring washers 184 maintain a force on the coil assembly to the left (FIG. 1). Rotating the nut 176 in one direction pulls the spool assembly 140 to the right against the spring forces of the washers, and turning the nut in the other direction moves the coil assembly to the left. In either case, spring washers 184 maintain force against the coil assembly so that the assembly stays in place and does not move longitudinally except during adjustment.

For redundancy and increased accuracy, multiple armatures and coil assemblies can be used. Multiple assemblies tend to compensate for any error in a single LVDT. FIG. 5 shows one possible arrangement. There, housing 200 mounts three LVDTs 202, 204 and 206 in a triangular pattern. They are spaced apart sufficiently to allow the respective tightening nuts 208, 210 and 212 to turn without interfering with each other.

While the specification describes particular embodiments of the present invention, those of ordinary skill can devise variations of the present invention without departing from the inventive concept.

We claim:

1. A linear variable differential transformer (LVDT) assembly with nulling adjustment comprising:

a housing defining a pressure barrier between first and second zones;

a thin-walled tube sealed to said housing and having a central section and an outer end extending into said second zone;

an LVDT multiple coil assembly extending around the central section of said tube; said coil assembly being longitudinally movable on said tube;

a magnetic member mounted on a mechanical linkage extending into said tube within the coils of said LVDT multiple coil assembly;

a fixed support extending around said tube near the outer end thereof;

said coil assembly including a threaded member extending through said fixed support;

a spring providing a force biasing said coil assembly toward said housing from said fixed support; and an adjusting nut on the other side of said fixed support from said housing, said adjusting nut engaging said threaded member, and said adjusting nut bearing on said fixed support as a result of the biasing force of said spring;

whereby the null position of the LVDT assembly may be adjusted by rotating said adjusting nut to shift the position of said LVDT coil assembly, without disassembling said tube from said housing.

2. The LVDT assembly of claim 1 wherein the spring comprises at least one spring washer around part of the coil assembly between the coil assembly and the fixed support.

3. The LVDT assembly of claim 1 wherein the fixed support is attached to the housing.

4. The LVDT assembly of claim 1 further comprising an opening through the housing, the mechanical linkage extending through the opening.

5. The LVDT assembly of claim 4 wherein the tube extends at least partially into the opening in the housing.

6. A linear variable differential transformer (LVDT) assembly with nulling adjustment comprising:
- a housing;
- a tube having at least a portion extending into the housing, the tube having a longitudinal axis and an inside and outside;
- an armature mounted at least partially in the inside of the tube and movable longitudinally within the tube;
- a coil assembly comprising a primary coil and two secondary coils, the coil assembly mounted on the outside of the tube and having a threaded end,
- an adjustable connection between the coil assembly and the housing for moving the coil assembly longitudinally with respect to the armature
- an adjusting nut threaded onto the threaded end of the coil assembly; and
- a support member within the housing, the adjusting nut contacting the support member whereby rotation of the adjusting nut against the support member moves the coil assembly longitudinally.

7. The LVDT assembly of claim 6 further comprising a pin in the support member and a longitudinal slot on the threaded end of the coil assembly, the pin engaging the longitudinal slot.

8. The LVDT assembly of claim 6 further comprising a spring providing a force that biases the coil assembly away from the fixed support.

9. The LVDT assembly of claim 8 wherein the spring comprises at least one washer around part of the coil assembly between the coil assembly and the fixed support.

10. The LVDT assembly of claim 6 further comprising an opening through the housing, the armature having a linkage extending through the opening.

11. The LVDT assembly of claim 10 wherein the tube extends at least partially into the opening in the housing.

12. The LVDT assembly of claim 6 wherein the primary coil is between the two secondary coils, the assembly further comprising at least one washer between the primary coil and each secondary coil.

13. The LVDT assembly of claim 6 wherein the coil assembly has an inner wall, the inner wall having a circular cross-section, and the tube having a circular cross-section.

14. The LVDT assembly of claim 6 wherein inside diameter of the inner wall of the coil assembly is slightly greater than the outside diameter of the tube.

15. The LVDT assembly of claim 6 further comprising a removable cap on the housing over the adjustable connection.

16. A linear variable differential transformer (LVDT) assembly with nulling adjustment comprising:
- a housing defining a pressure barrier between first and second zones;
- a tube sealed to the housing and having a central section and an outer end extending into the second zone;
- an LVDT multiple coil assembly extending around the central section of the tube and being movable longitudinally on the tube;
- an armature mounted on a mechanical linkage extending into the tube within the coils of the LVDT multiple coil assembly;
- a support extending around the tube near the outer end of the tube;
- the coil assembly including a threaded member extending through the fixed support;
- a spring providing a force biasing the coil assembly toward the housing from the fixed support; and
- an adjusting nut on the other side of the fixed support from the housing, the adjusting nut engaging the threaded member, and the adjusting nut bearing on the fixed support as a result of the biasing force of the spring.

17. The LVDT assembly of claim 16 wherein the spring comprises at least one washer around part of the coil assembly between the coil assembly and the fixed support.

18. The LVDT assembly of claim 16 wherein the fixed support is attached to the housing.

19. The LVDT assembly of claim 16 further comprising an opening through the housing, the mechanical linkage extending through the opening.

20. The LVDT assembly of claim 19 wherein the tube extends at least partially into the opening in the housing.

21. A linear variable differential transformer (LVDT) assembly with nulling adjustment comprising:
- a housing;
- a tube having at least a portion extending into the housing, the tube having a longitudinal axis and an inside and outside;
- an armature mounted at least partially in the inside of the tube and movable longitudinally within the tube;
- a coil assembly comprising a primary coil and two secondary coils, the coil assembly mounted on the outside of the tube,
- an adjustable connection between the coil assembly and the housing for moving the coil assembly longitudinally with respect to the armature; and
- an opening through the housing, the armature having a linkage extending through the opening.

* * * * *